United States Patent [19]

Takita et al.

[11] Patent Number: 5,392,208
[45] Date of Patent: Feb. 21, 1995

[54] PLANT CONTROL SYSTEM AND METHOD FOR DISPLAYING CONTROL CIRCUIT THEREOF

[75] Inventors: Atsushi Takita, Mito; Masato Okano, Hitachi; Haruya Tobita, Hitachi; Shinya Kikuchi, Hitachi; Yataro Suzuki, Ibaraki; Akira Sugano; Yukihiro Oda, both of Katsuta; Akira Kaji, Hitachi, all of Japan

[73] Assignees: Hitachi, Ltd., Tokyo; Hitachi Engineering Co., Ltd., Ibaraki, both of Japan

[21] Appl. No.: 147,039

[22] Filed: Nov. 4, 1993

Related U.S. Application Data

[63] Continuation of Ser. No. 581,457, Sep. 13, 1990, abandoned.

[30] Foreign Application Priority Data

Sep. 13, 1989 [JP] Japan .................................. 1-237882

[51] Int. Cl.⁶ .............................................. G06F 15/46
[52] U.S. Cl. .................................... 364/188; 364/578
[58] Field of Search ............... 364/146, 188–191, 364/578, 488–490, 551.01; 376/215–217; 340/716, 717, 734; 345/151, 163

[56] References Cited

U.S. PATENT DOCUMENTS

| | | | |
|---|---|---|---|
| 4,727,473 | 2/1988 | Anderson et al. | 364/191 |
| 4,852,047 | 6/1989 | Lavallee et al. | 364/191 |
| 4,914,568 | 4/1990 | Kodosky et al. | 364/578 |
| 4,942,514 | 6/1990 | Miyagahi et al. | 364/190 |
| 4,970,664 | 11/1990 | Kaiser et al. | 364/488 |
| 5,089,978 | 2/1992 | Lipner et al. | 364/188 |
| 5,157,668 | 10/1992 | Buenzli, Jr. et al. | 364/489 |
| 5,253,160 | 10/1993 | Lin | 364/188 |
| 5,271,045 | 12/1993 | Scarola et al. | 364/188 |

*Primary Examiner*—Roy N. Envall, Jr.
*Assistant Examiner*—Thomas E. Brown
*Attorney, Agent, or Firm*—Antonelli, Terry, Stout & Kraus

[57] ABSTRACT

A method and apparatus for displaying on a display screen the controlling circuit in a plant controlling system for controlling a plant by a controller using a microcomputer. The display screen is segmented into a software region and a hardware region. The software circuit which is realized by software is displayed in the software region, and the hardware circuit related to the software circuit is displayed in the hardware region. The information, which is plotted during the interactive process and is displayed in the software regions, is automatically translated into a program for controlling the controller. Operation data of the plant is also given on the display screen. Desired circuit elements of the software circuit may be selected to change parameters of the circuit elements. Maintenance work can be carried out while observing the indication on the display screen without any aid of documents such as the maintenance manual or the like.

7 Claims, 8 Drawing Sheets

PLANT CONTROL SYSTEM AND METHOD FOR DISPLAYING CONTROL CIRCUIT THEREOF

This application is a continuation of application Ser. No. 07/581,457, filed on Sep. 13, 1990, now abandoned.

BACKGROUND OF THE INVENTION

This invention relates to a plant controlling system for controlling a plant by a controller using a microcomputer, and particularly to a method of controlling a plant by integrating production and maintenance of the software and hardware of the system so as to provide information concerning the operation of the overall system for maintenance purposes, and maintenance apparatus to an operator thereof for accomplishing the same.

A controller using a microcomputer has been employed so as to facilitate designing, maintenance and adjustment of a plant controlling system. The plant controlling system based on hardware control is being gradually replaced by that based on software control.

However, hardware circuits are still used in the plant controlling system so as to ensure necessary minimum backup and protection of the system, so that the plant can keep its reliable operation or stop its operation without any inconvenience when the controlling system adopting a microcomputer is out of order. In addition, the plant controlling system includes sensors for detecting process signals or an operating unit for adjusting the amounts of processes.

FIG. 2 of the accompanying drawings shows an example of a fundamental configuration of a plant controlling system.

In FIG. 2, a controller 1 comprises a CPU2, a digital input card (referred to as DI card hereinafter) 3, a digital output card (DO card) 4, an analog input card (AI card) 5, an analog output card (AO card) 6, and a PI/O bus 7. A manual backup circuit 8 enables the continuous operation of a plant according to a command from an operation panel 9 which includes a manual operation designating unit and switches. The manual backup circuit permits the manual operation of the operating unit in an emergency due to malfunction of the controller or the like. In general, a plant 10 comprises a plurality of devices 11.

FIG. 3 shows the detailed fundamental configuration of a part of the controller of FIG. 2, which is associated with one particular device 11.

In FIG. 3, reference numeral 20 stands for functions, depicted as a circuit, to be carried out according to the software stored in a memory of CPU 2. Circuit elements 21, 24, 25, 27, 31, 33 are written by macro languages. The circuit element 21 is an input diagnosis macro, which diagnoses the status of process based on the rationality of a signal 22 fetched by the AI card, and outputs a logical signal 23 in case of abnormality. The circuit element 24 is a comparator, which compares the output of a control target setter (SET) 25 with the amount of process status, and outputs a deviation signal 26. The deviation signal 26 is inputted into a proportional integrator (P+I) 27, while being outputted from the AO card 6 to be indicated on a deviation indicator 28 on the operation panel 9. The proportional integrator 27 is set to either the automatic or manual control mode according to the automatic/manual logic signal 29 inputted through the DI card 3. In the automatic control mode, the proportional integrator 27 performs the proportional integration according to the deviation signal 26. In the manual mode, the proportional integrator 27 tracks the command signal 30 which is fetched via the AI card to be applied to the operation unit. The circuit element 31 is an output diagnosis macro, which compares the output from the proportional integrator 27 with the command signal 30, and checks the rationality of the signal with respect to sudden signal transformation, disconnection or the like. When detecting abnormality, the circuit element 31 issues a logical signal 32. The circuit element 33 is an OR macro, which outputs a signal indicative of the malfunction of the device in question according to the diagnosis macros 21 and 31 via the DO card 4.

A current/voltage converter 40 in the manual backup circuit 8 converts a current output, from a sensor 41 for detecting the amount of process status, into voltage. The output from the current/voltage converter 40 is inputted in the AI card 5, while being displayed on the indicator 42 provided on the operation panel 9. According to an output from the automatic/manual mode selecting logic 44, a signal selector 43 selects an output as follows:

In the automatic mode, the signal selector 43 selects an automatic operation output sent via the AO card 6 from the controller. In the manual mode, the signal selector 43 selects an output from a manual operation analog memory (AM) 45. The output from the signal selector 43 is inputted into a voltage/current converter 46, and serves as a signal for operating the operation unit 49 of the device, while being supplied to the AI card 5, and displayed on an indicator 47 on the control panel 9. An electricity pressure converter 48 converts the output from the voltage/current converter 46 into air pressure so as to control the operation unit 49. The mode of the analog memory 45 is selected according to the output from the automatic/manual mode selection logic 44. In the automatic mode, the analog memory 45 follows the output from the selector 43. In the manual mode, the output of the analog memory 45 is increased or decreased by a switch 50 on the operation panel 9. The automatic/manual mode selecting logic 44 selects either automatic or manual mode of the operation unit according to the control abnormality signal or the like outputted from the DO card 4 or operation of the automatic/manual mode selecting switch 51.

FIG. 4 illustrates an example of the automatic/manual mode selecting logic 44 shown in FIG. 3. The logic 44 includes an OR circuit 70, NOT circuits 71, and an AND circuit 72, all of which comprise hard wired logic.

As described above, the plant controlling system employing a controller adopting a microcomputer not only comprises software logic controlled by the controller but also comprises a variety of hardware such as the manual backup circuit 8, the operation panel 9 including a manual operation designating unit, switches, and devices 11.

To localize malfunction or to facilitate the maintenance work, the plant controlling system often adopts the distributed control method according to which one or more controllers 1 shown in FIG. 2 are employed.

In the plant controlling system employing a plurality of controllers, a maintenance apparatus is employed so as to perform software programming, to monitor operation of the controlling system and to tune parameters.

FIG. 5 shows an example of connection of a maintenance apparatus to the plant controlling system.

The maintenance apparatus 101 is connected to a channel 100 via which a plurality of controllers 1a to 1n are interconnected. Sometimes one controller is sufficient, and the maintenance apparatus may be connected to the controller by means other than the communication network. The maintenance apparatus 101 comprises a processing unit 102, a display unit 103 and an interactive operation unit 104.

In a conventional maintenance apparatus, the maintenance work is carried out by displaying only the software circuit 20 on the display unit 103, as illustrated in FIG. 6. Connection with the hardware outside the maintenance apparatus is known only from comments displayed on the screen of display unit 103 in association with input/output signal lines.

In addition, only a unit of minimum program executed by one controller, so-called one sheet, is displayed on the screen of the display unit 103 at a time because of limitations such as resolution of the display unit comprising a cathode ray tube (CRT).

Methods of displaying control circuits by means of logic symbols are exemplified in Japanese Patent Laid-Open Publications (KOKAI) Nos. 169804/1982 and 65510/1988, and U.S. Pat. No. 4,445,169.

In the related art, only the software circuits of the controller are displayed on the display unit of the maintenance apparatus as mentioned above. However since the plant controlling system has a variety of hardware besides the software circuits, a number of documents including shop drawings, operation manuals and so forth should be referred to so as to grasp the operation of the overall system.

With conventional plant controlling systems, the maintenance personnel are required to understand the overall system by referring to the above-mentioned documents first, and then perform the maintenance work by displaying the software circuits on the display unit of the maintenance apparatus. Therefore it is very difficult to perform quick and reliable maintenance work by using such a maintenance apparatus.

The controller has a plurality of sheets of the software circuits. Since the conventional maintenance apparatus displays only one sheet at a time, it is very difficult to grasp the overall flow of signals from the functional view point.

Moreover, when the plant controlling system comprises a plurality of controllers depending upon the scale and nature of the system, the controllers mutually exchange signals via communication paths so as to realize a certain control function. In such a case, it is very difficult to maintain the plant by grasping its overall functions since the maintenance apparatus can display the software circuits of only one controller at a time.

In addition, since the conventional maintenance apparatus aims at maintaining only the software regions of the controller, it is necessary to provide an additional controlling system for preparing documents to perform the maintenance work of the controller including the hardware regions.

SUMMARY OF THE INVENTION

It is therefore an object of this invention to provide a plant controlling system, a method for displaying control circuit thereof and a maintenance apparatus for controlling a plant by a controller using a microcomputer, so that the maintenance work can be carried out by understanding the overall controlling system while observing only indications given on a display screen without referring to documents such as shop drawings, operation manuals, or the like.

A further object of this invention is to enable preparation of documents concerning the hardware circuits as well as the software circuits so as to integrate the maintenance work and document preparation.

According to this invention, there is provided a method for displaying on a display screen a control circuit of a plant controlling system for controlling a plant by a controller using a microcomputer. This method comprises the steps of segmenting the display screen into a software region and a hardware region, displaying a software circuit, which is realized by software, in the software region in graphics, and displaying a hardware circuit, which is related to the software circuit, in the hardware region in graphics.

In the method, if the plant is to be controlled by a plurality of controllers, a plurality of controller frames segmenting the software region are provided for the plurality of controllers, and the software circuits of the plurality of controllers are displayed in the respective controller frames.

Sheets frames are provided each corresponding to a predetermined program unit, and the software circuits of the predetermined program units are displayed within the respective sheet frames.

When a plurality of controllers are used, the sheet frames can be displayed for each controller.

A maintenance apparatus according to this invention is used with a plant controlling system which controls a plant by a controller using a microcomputer, and is used for transferring a control program to the controller. The maintenance apparatus comprises an interactive process means for segmenting a display screen for a software circuit, which is a base of the control program, and a hardware circuit connected to the peripheral of the software circuit and for making a plot by interactive operation, a plot information storage means for storing the information plotted by said interactive process means, and means for extracting the plot information of the software circuit from the plot information storage means and for translating the plot information into the control program.

It is preferable that the maintenance apparatus further comprises a document preparing means for obtaining the content of storage from the plot information storage means to prepare various kinds of documents relating to said software circuit and/or hardware circuit.

The maintenance apparatus further comprises means for collecting operation data of the plant from the controller executing the control program and for displaying the information concerning the operation data in association with the corresponding portion of the circuit displayed on the display screen.

The maintenance apparatus is for use in a plant controlling system which controls a plant by a controller using a microcomputer, and is used for transferring a control program to the controller. The apparatus comprises a display means for simultaneously displaying, on the display screen in graphics, a software circuit corresponding to the control program and a hardware circuit to be connected to the peripheral of the software circuit, and a storage means for storing beforehand plot information concerning said hardware circuit to be displayed on the display screen by said display means.

A plant controlling system of the present invention for controlling a plant automatically or manually comprises a controller using a microcomputer, a manual backup hardware circuit for the controller, an input-/output hardware circuit, and a maintenance apparatus for transferring a control program to the controller. The manual backup hardware circuit and the input/output hardware circuit, together with a software circuit of the control program, are simultaneously displayed on a display unit of the maintenance apparatus in graphics.

In the plant controlling system, a display screen of the display unit of the maintenance apparatus is segmented into a software region, in which the software circuit is to be displayed, and a hardware region in which the hardware circuit is to be displayed. The software region is displayed within the sheet frame while the hardware region is outside the sheet frame.

The software information is plotted in the software region while the hardware information is plotted in the hardware region. The maintenance apparatus recognizes that the plot information is related to the software if the information is within the software region on the display. Otherwise, the information is related to the hardware. Therefore, it is possible to automatically translate the plot information in the software region into the control program (programming). In addition, it is possible to modify the controller software by correcting the existing plot information on the software circuit.

It is possible to collect operation data of the plant from the controller executing the control program and to display the operation data in association with the corresponding portion of the circuit displayed on the display screen. This enables monitoring of the current control operation of the controller. This monitoring function is applicable to the hardware circuit as well as the software circuit since the operating state of the hardware circuit is also displayed.

It is possible to select a given circuit element (macro) of the software circuit based on data on the display screen and to change parameters of the circuit element (so-called tuning function).

The foregoing maintenance work can be executed while observing the circuit configuration of the corresponding hardware circuit indicated on the display screen without referring to the documents such as shop drawings or operation manuals. This allows the maintenance work to be carried out quickly and reliably while recognizing the overall controlling system.

On the display screen of the maintenance apparatus, the controller frame is provided for each controller, and the sheet frame is provided for each sheet, so that it is possible to recognize that the plot information is related to a particular sheet of a particular controller. Therefore the software circuit of the particular sheet can be independently programmed, tuned and monitored. In this case, the configuration of the related hardware circuit and related controller can be checked by observing the display screen without referring to the concerned documents.

According to this invention, the display screen is segmented into the software region and hardware region, so that data on the software circuit and those on the hardware circuit can be given independently. It is possible to prepare a variety of documents concerning the hardware such as hardware packaging diagrams and connection diagrams based on the hardware data indicated in the hardware region of the display screen, and to integrate the system for production and maintenance of the software, and that for production of the hardware.

DETAILED DESCRIPTION

Figure 5:
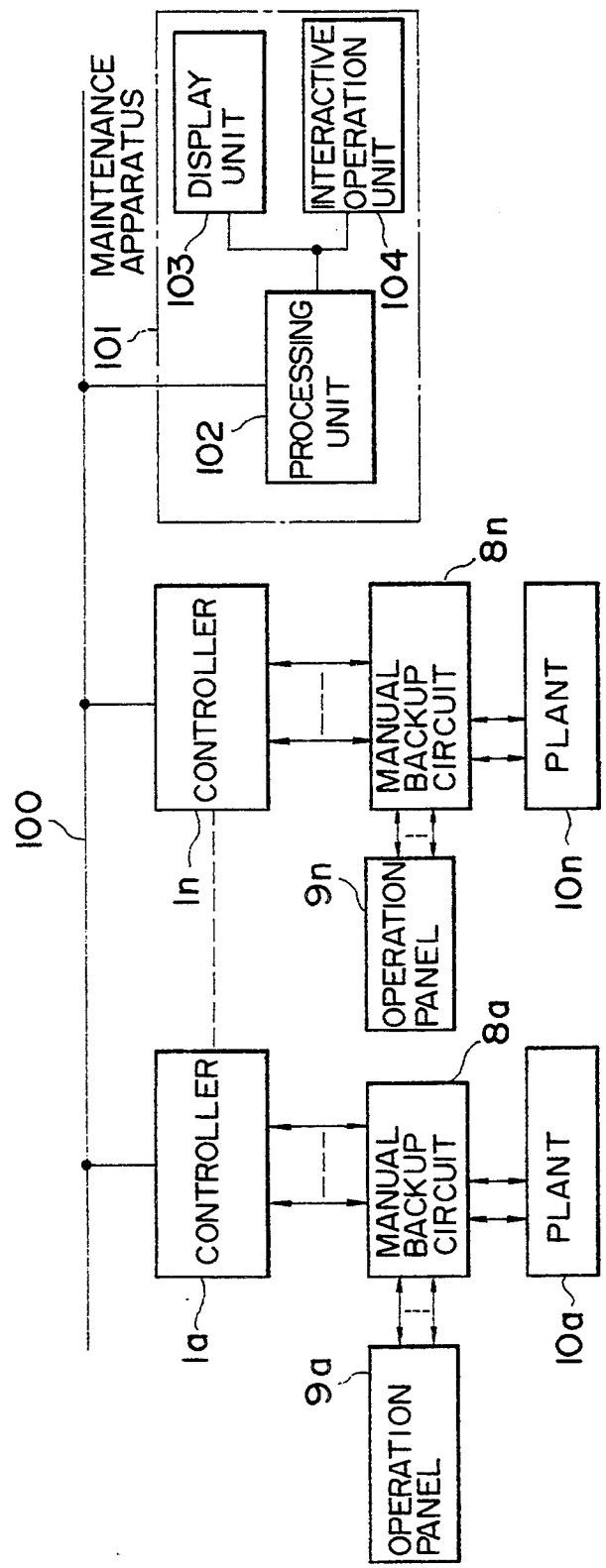
FIG. 5 is a block diagram showing the configuration of the plant controlling system comprising a plurality of controllers, and a maintenance apparatus connected to the plant controlling system.
Figure 6:
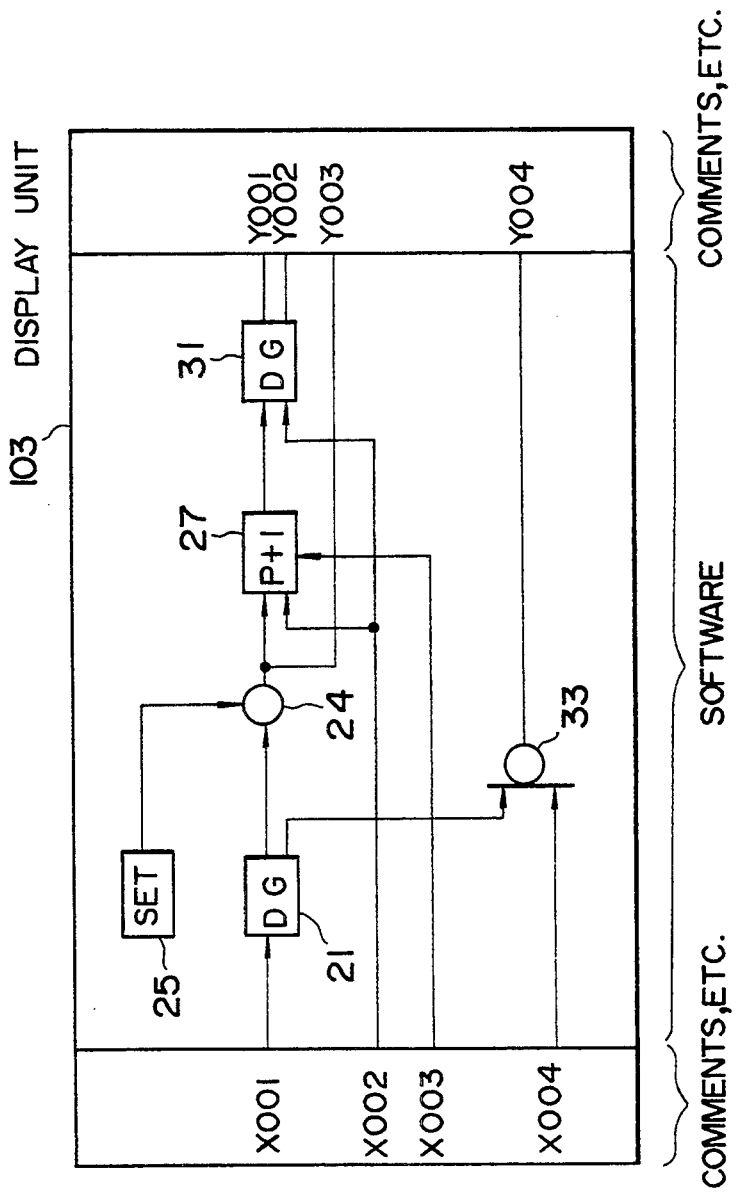
FIG. 6 shows an example of the display given on a conventional maintenance apparatuses.
Figure 8:
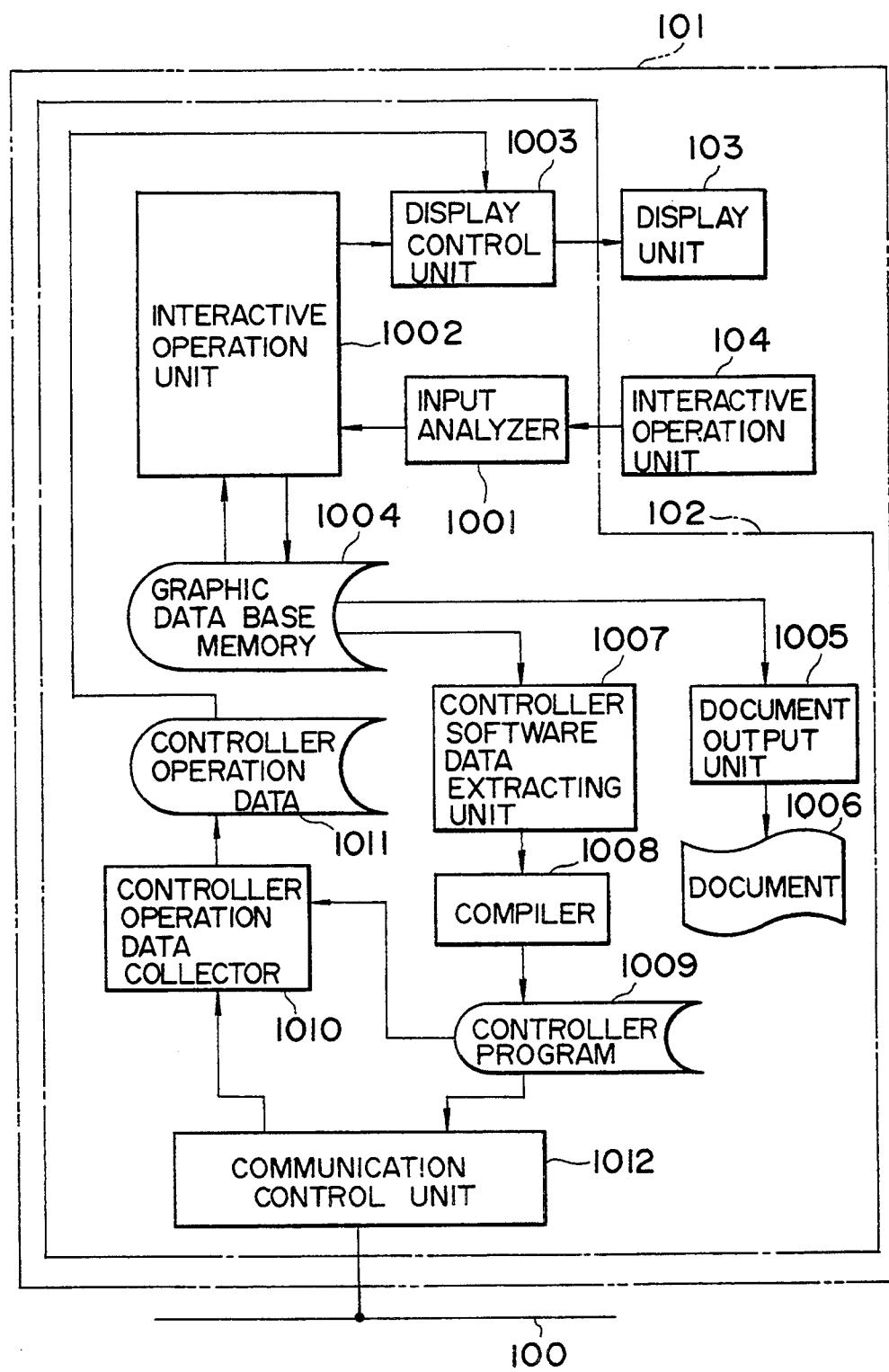
FIG. 8 is a block diagram showing the configuration of the maintenance apparatus of the invention.

FIG. 8 illustrates one example of the configuration of a maintenance apparatus (corresponding to the maintenance apparatus 101 in FIG. 5) for a plant controlling system according to this invention.

The feature of the maintenance apparatus 101 is the configuration of a processing unit 102 which is illustrated in detail in FIG. 8. The processing unit 102 comprises a input analyzer 1001, interactive process unit 1002, a display control unit 1003, a graphic data base memory 1004, a document output unit 1005, a controller software information extracting unit 1007, a compiler 1008, a controller program memory 1009, a controller operation data collecting unit 1010, a controller operation data memory 1011, and a communication control unit 1012.

The input analyzer 1001 analyzes data inputted by the operator manipulating an interactive operation unit 104 (including an input device such as a keyboard), and issues, to the interactive process unit 1002, a command according to the analyzed result. The operator operates the interactive operation unit 104 so as to perform operations such as programming, tuning and document outputting.

The interactive process unit 1002 controls the operation of the maintenance apparatus 101 according to the command from the input analyzer 1001. For example, the interactive process unit 1002 prepares a graphic data base for the software circuit and the hardware circuit according to the command from the input analyzer 1001, and stores the graphic data base in the graphic data base memory 1004. The interactive process unit 1002 also reads the graphic data base from the memory 1004 and corrects the graphic data base.

The graphic data base memory 1004 stores beforehand not only the graphic data base for the software circuit and the hardware circuit but also keeps logic symbols for the software circuit, background data on the display screen and so forth.

The display control unit 1003 accepts the content of the graphic data base memory 1004 via the interactive process unit 1002, and displays the software circuit and the hardware circuit on the display unit 103. As the monitoring function, the display control unit 1003 accepts the controller operation data 1011 from the controller operation data collector 1010, and gives indications corresponding to the controller operation. The controller operation data 1011 include the result of the arithmetic operation in the controller and current values of the parameters or the like. These data are collected by the controller operation data collector 1010 via the communication control unit 1012. The controller operation data are displayed as digital values which are periodically updated and attached beside signal lines of the software circuit given on the display screen, or by changing the colors of the displayed signal lines according to "0" and "1" with respect to the digital signal lines. In this embodiment, the display unit 103 is a cathode ray tube (CRT) having a high resolution.

The controller software data extracting unit 1007 extracts the controller software information in the software frame of the graphic data base memory 1004 separately from the hardware information. The software information is translated by the compiler 1008 into the controller program 1009 to be loaded in a controller. The controller program 1009 is loaded in a desired controller via the communication control unit 1012. The controller in question receives the controller program 1009, and executes the program so as to control the controller operation. In summary, the interactive operation unit 104 aids the operator to prepare and corrects a logic diagram for the software, and then the software data are extracted and compiled so as to execute the programming function.

The document output unit 1005 prints out a document based on the content stored in the graphic data base memory 1004. For instance, the document output unit 1005 prints graphic data of the software circuit and the hardware circuit, or prints a parameter list or the like.

Figure 1:
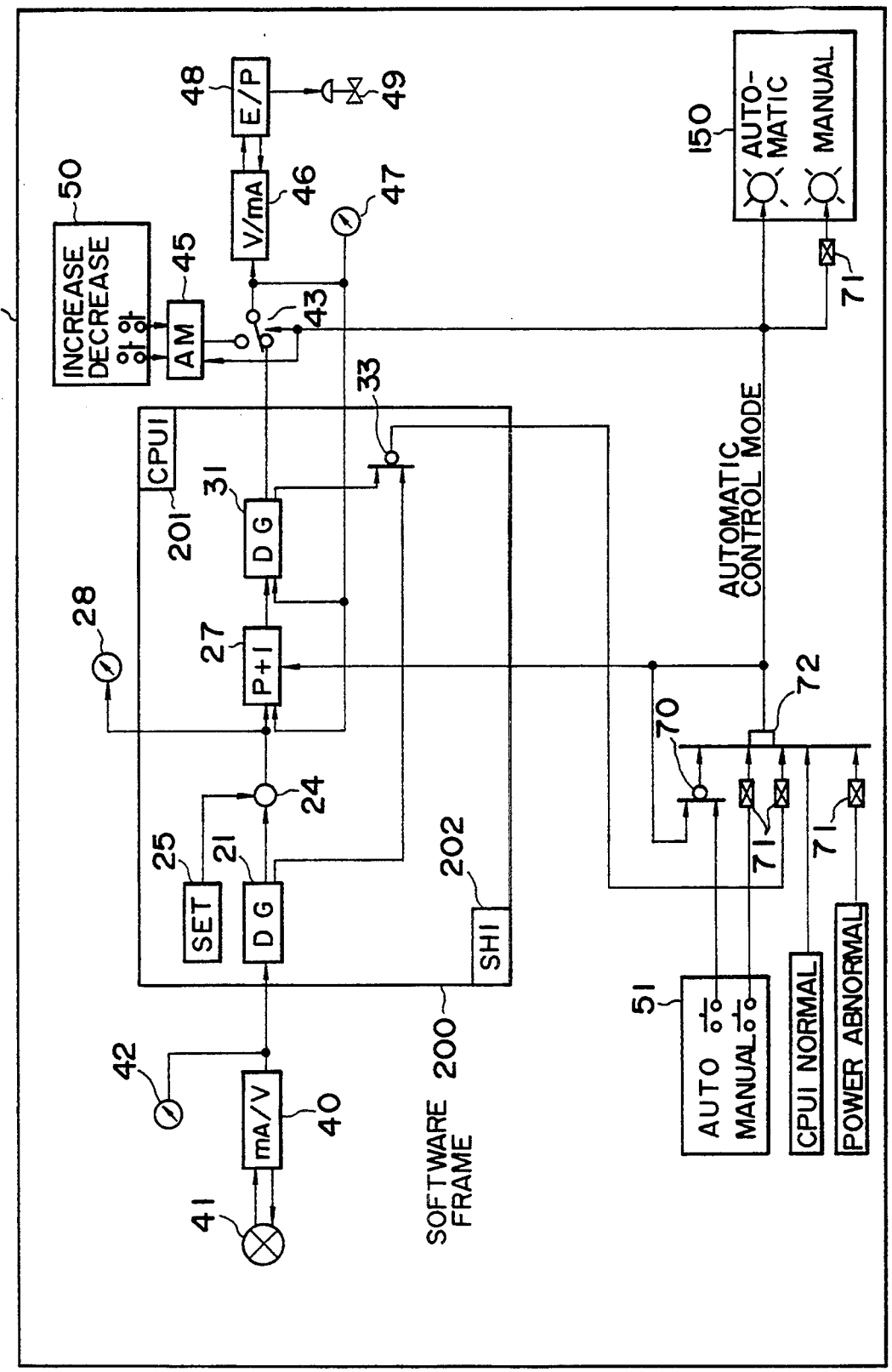
FIG. 1 is one example of display given on a display screen of a maintenance apparatus according to one embodiment of this invention.
Figure 2:
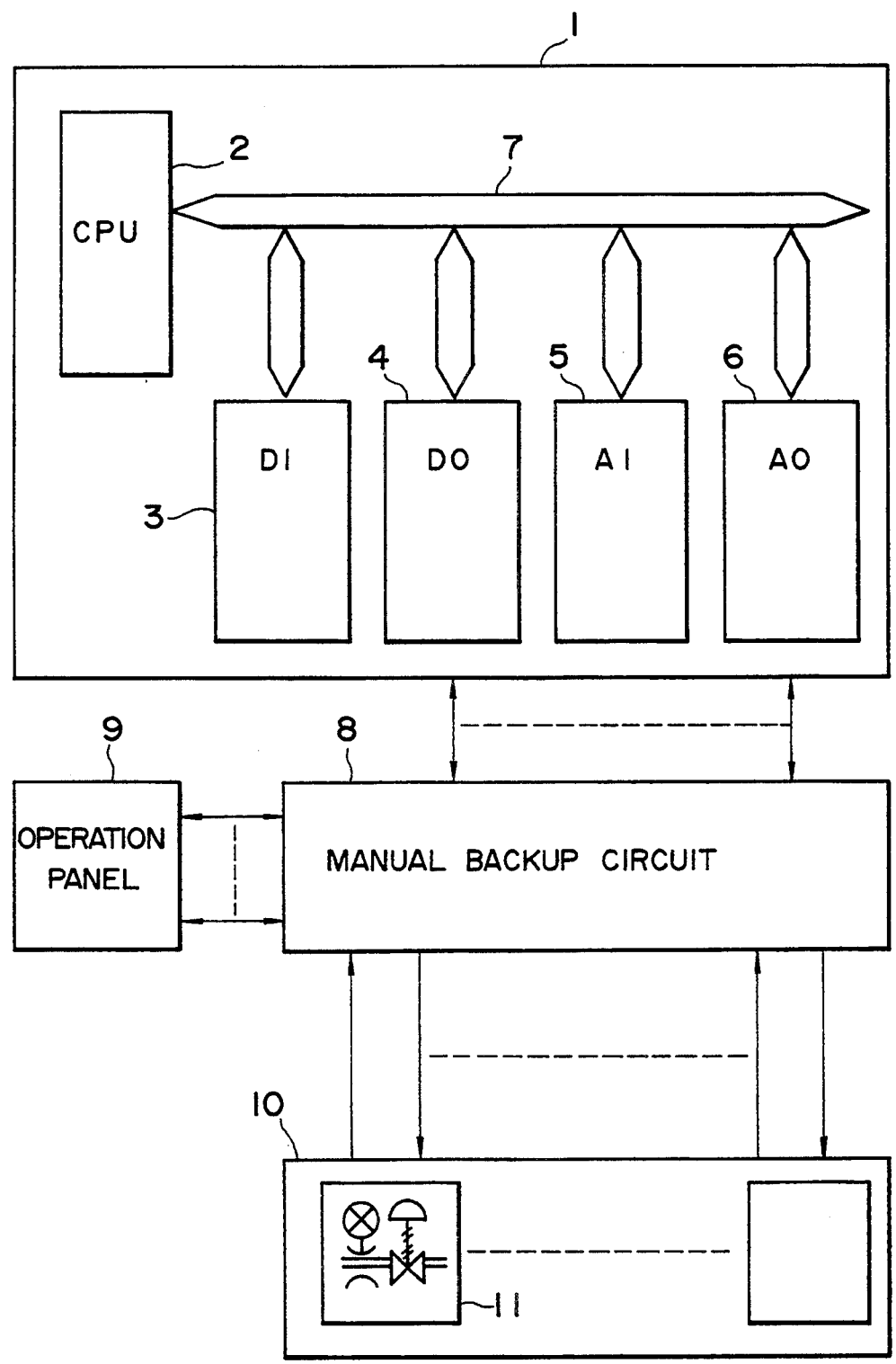
FIG. 2 is a block diagram showing the configuration of a plant controlling system to which this invention is applicable.

FIG. 1 shows an example of display given by the display unit 103 of the maintenance apparatus 101 according to this embodiment. The display unit 103 shows a display corresponding to those illustrated in FIG. 3.

Figure 3:
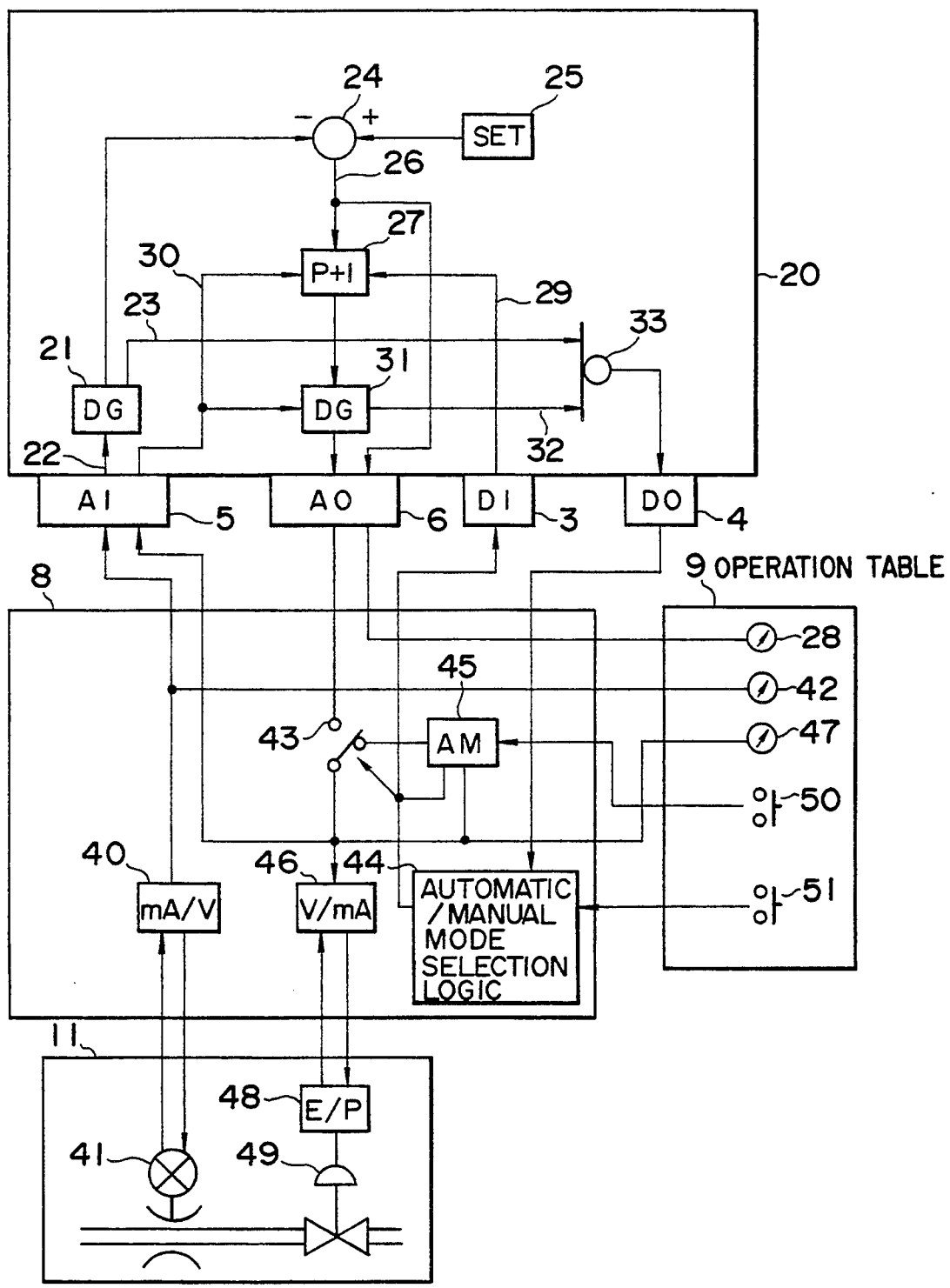
FIG. 3 is a block diagram showing, in detail, a part of the controlling system of FIG. 2.
Figure 4:
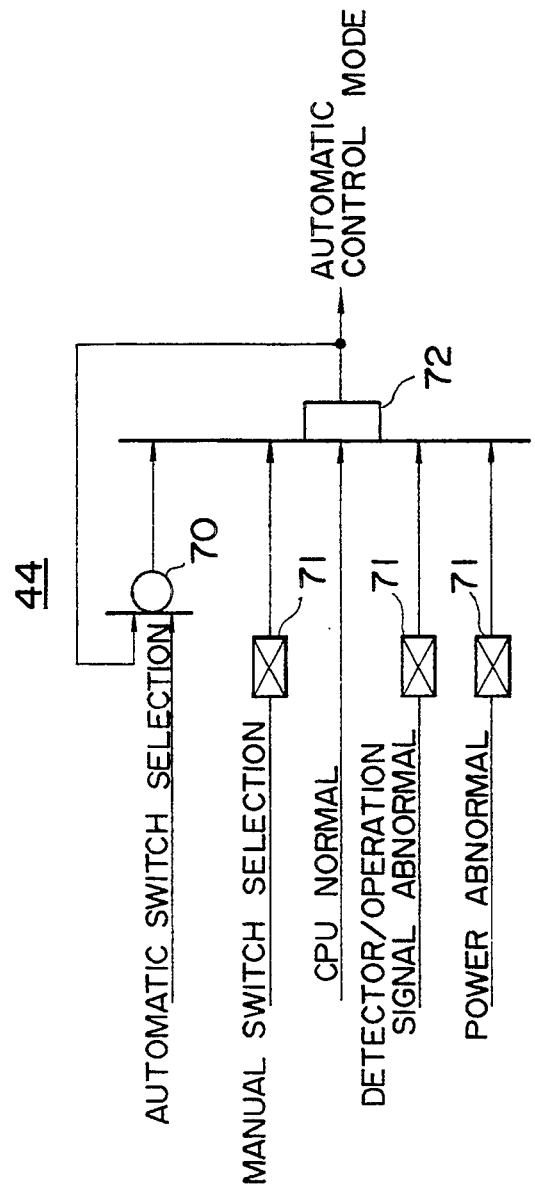
FIG. 4 shows one example of an automatic/manual mode selecting logic comprising the hardware illustrated in FIG. 3.

Reference numeral 150 designates lamps, which indicate the automatic mode or the manual mode on the display unit. The elements having the same functions as those in FIGS. 3 and 4 are assigned the like reference numerals, and their explanation will be omitted.

200 designates the software frame for separating the software region for the software circuit and the hardware region for the hardware circuit. The software region is inside the software .frame 200.

201 designates a name of a controller, showing that the circuit in the software region is realized in "CPU1".

202 designates a name of a sheet, showing that the software circuit belongs to "SH1" in the "CPU1."

The processing unit 102 of the maintenance apparatus fetches the elements in the software frame from the displayed information, and executes the program of the sheet corresponding to the object controller. The translated program is down-loaded to the controller from the maintenance apparatus 101, and is executed on the controller so as to control the plant controlling system actually.

The maintenance apparatus 101 reads out, from the controller, input signals and output signals of the macro displayed in the software frame, and sequentially renews the data in the software circuit displayed on the screen of the display unit 103 so as to monitor the controller operation. It is possible to display the operation data of the hardware circuit when the hardware circuit operates in association with the software circuit. It is also possible to designate a certain macro in the software frame on the display screen of the display unit 103, to read out the parameters of the designated macro from the controller, to display the parameters, and to tune (modify) the parameters to those inputted by the maintenance apparatus 101. The maintenance personnel can perform the maintenance work quickly and understand the overall controlling system by simultaneously referring to both of the software circuit and the hardware circuit displayed on the screen without using any document.

For example, when changing a control set point of the control target setting unit 25 in the automatic mode, the operation unit 49 would get out of control, thereby disturbing the plant. In such a case, if only the data in the software frame is displayed on the display unit 103, it is impossible to recognize what has caused the disturbance, and what measures should be taken to overcome such disturbance. Therefore it is required to perform the maintenance work by referring to a document concerning the overall controlling system.

In this embodiment, it is possible to recognize the concerned overall controlling system by observing the display unit 103. Therefore, the following matters are reminded without referring to any document or the like. The control operation in question can be switched to the manual mode by operating the automatic/manual mode selection switch 51. The manual increase/decrease switch 50 is can be operated in order to perform manual control in the manual mode. After that, the angle-of-opening indicator 47 and the amount-of-status-of-plant indicator 42 should be observed in the manual control mode.

Figure 7:
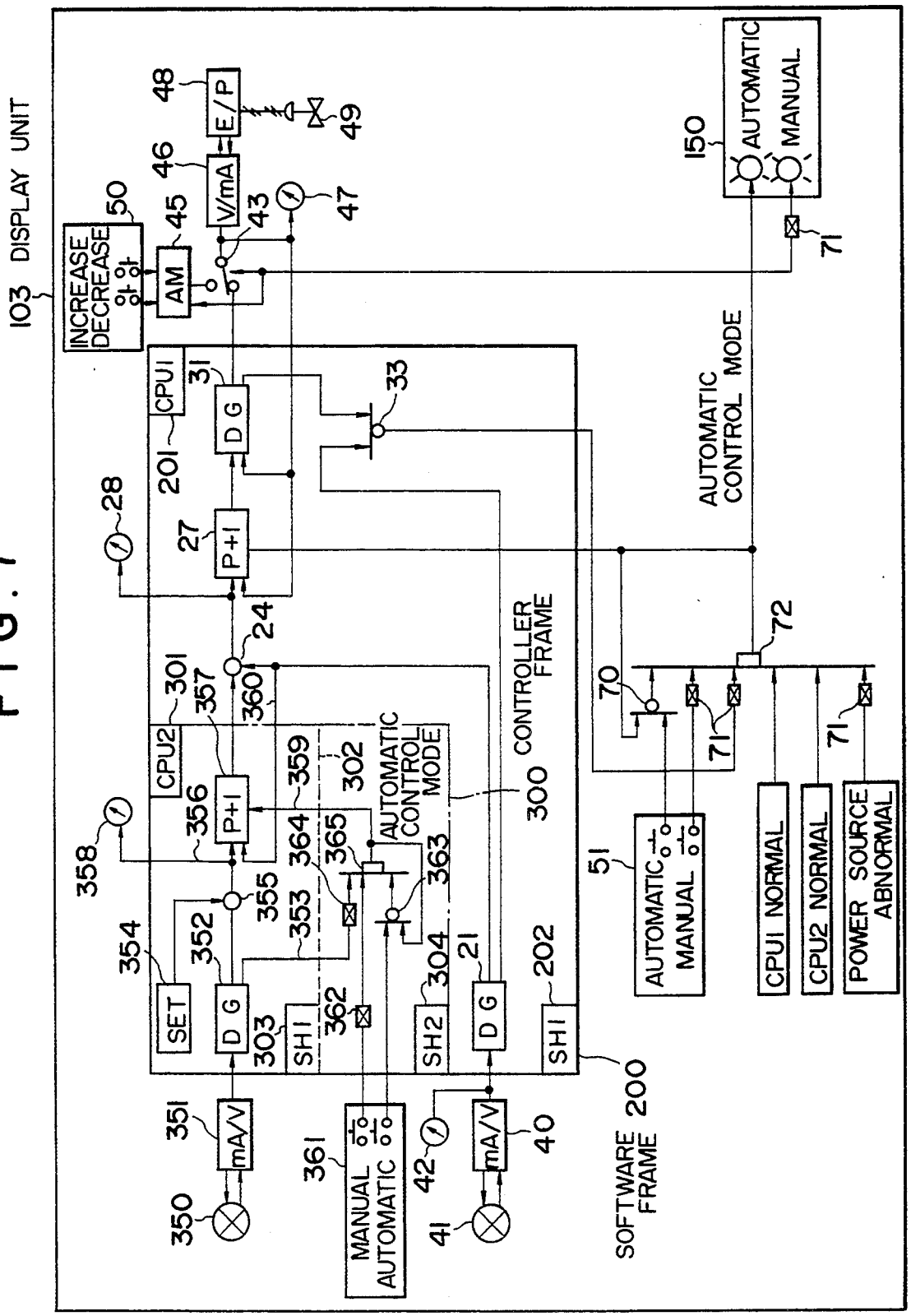
FIG. 7 shows an example of a further display given on a maintenance apparatus according to the invention.

FIG. 7 shows one example of display given on the display unit 103 of the maintenance apparatus. In this case, control items shown in FIG. 3 are subject to the cascade control. The master control loop is realized in the controller CPU2 which is different from the controller for the minor control loop. The minor control loop is realized in CPU1 as in the case shown in FIG. 1. The change is that the control set point is not a fixed value but is determined by CPU2.

In FIG. 7, the controller frame 300 in the software frame 200 represents a controller region in the software frame. 201, 301 designate the names of the controllers, and indicate that the regions segmented by the controller frame belong to CPU1 and CPU2, respectively. 302 represents a sheet segmented in the controller frame.

303 and 304 stand for sheets, and indicate that the regions segmented by the sheet frames belong to "SH1" and "SH2", respectively. 350 in the left upper corner of FIG. 7 designates a sensor for detecting the amount of status of process of the master control loop. 351 designates a converter, which converts a current signal from the sensor 350 into a voltage. 352 designates an input signal diagnosing macro, which checks the rationality of the fetched amount of status of process and outputs a logical signal 353 in an emergency. 355 designates a comparator which compares the output of the control target setting unit in the master loop with the amount of status of process, and issues a deviation signal 356. The deviation signal 356 is not only inputted into the proportional integrator 357 but also outputted outside the controller so as to be displayed on the deviation indicator 358. The proportional integrator 357 is set to the automatic or manual mode by the control mode signal 359 from SH2. When set to the automatic mode, the proportional integrator 357 performs the proportional integration according to the deviation signal 356. Under the manual mode, the proportional integrator 357 tracks the amount of status of process 360 which is related to the minor control loop and is fetched from the CPU1. The output of the proportional integrator 357 is applied to the comparator 24 in the CPU1.

The automatic/manual mode selector 361 in the master control loop is connected to the CPU2. In the SH2, the selector 361 composes an automatic/manual mode selection interlocking circuit together with NOT macros 362, 364, an OR macro 363, and an AND macro 365.

Also, according to this embodiment, each element plotted on the display unit 103 of the maintenance apparatus is checked concerning to which region of the software frame, controller frame and sheet frame the element belongs. Then the element is identified to belong to a particular sheet of a particular controller. Based on the names of a particular macro and interconnection data, programming, monitoring and tuning can be carried out. The operating state of the control system is given on the display screen of the display unit 103. In addition, mutual and functional connections between units belonging to a plurality of sheets of the controllers and the hardware circuits are displayed in the form to enable the maintenance personnel to understand the overall system without referring to means such as documents. Therefore, the maintenance personnel can maintain the plant reliably and effectively by understanding not part of the software of the controller but the overall functions of the controlling system easily.

In the examples shown in FIGS. 1 and 7, the elements displayed in the region outside the software frame are hardware circuits. Shop drawings and packaging drawings for manufacturing hardware circuit elements can be automatically prepared based on interconnection data and packaging data, so that integration of the maintenance and production system can be realized.

Up to now the above processing has been carried out by manufacturers' large computers serving as hardware and software producing facilities. According to the invention, such processing can be executed by the small maintenance apparatus which can be installed together with the plant controlling system at a site.

As described above, the display unit of the maintenance apparatus can display not only the software circuits of the controller but also the input/output hardware circuit related to the software circuit or the hardware to and from which signals are transferred, so that the maintenance work can be appropriately carried out by understanding the overall system without using any maintenance documents.

Software circuits for a plurality of controllers can be simultaneously displayed, and the software circuit in one controller can be displayed in segmented sheet frames. Even in a large or complicated control system in which a plurality of controllers are used, the maintenance work can be carried out appropriately while understanding the overall system indicated on the display unit without referring to maintenance manuals or the like.

The software data and hardware data plotted on the display unit of the maintenance apparatus are segmented into software frames, controller frames and sheet frames, thereby allowing automatic preparation of documents for programming a plurality of controllers and for producing hardware production documents.

In addition, the above-mentioned work which has been carried out separately for hardware and for software by a large computer can be quickly done at a site after the controlling system is installed.

What is claimed is:

1. A method for displaying on a display screen a control circuit including software and hardware circuits of a plant controlling system for controlling a plant by a controller using a microcomputer, said method comprising the steps of:
   (a) segmenting said display screen into a software region and a hardware region;
   (b) displaying said software circuit, which is realized by software being executed by said microcomputer, in said software region in graphics; and
   (c) displaying, at the same time said software circuit is being displayed, in said hardware region in graphics, said hardware circuit, said hardware circuit includes elements representative of parts of said plant and is controlled by said controller based on said software being executed by said microcomputer, said software and hardware circuits being displayed such that input and output relationships between said software and hardware circuits are indicated.

2. A method according to claim 1, wherein sheet frames corresponding to predetermined program units are provided in said software region, and portions of said software circuit corresponding to said predetermined program units are displayed within respective sheet frames.

3. A method according to claim 1, wherein when said plant is controlled by a plurality of controllers, a plurality of controller frames segmenting said software region are provided corresponding to said plurality of controllers, and software circuits of said plurality of controllers are displayed in said corresponding controller frames.

4. A method according to claim 3, wherein sheet frames corresponding to predetermined program units of a controller are provided within a controller frame corresponding to said controller, and software circuits of said predetermined program units are displayed within respective sheet frames.

5. A maintenance apparatus for use with a plant controlling system having a controller using a microcomputer for controlling a plant and for transferring a control program to the controller, said apparatus comprising:
   (a) circuit producing means for producing at the same time by plotting plot information on a segmented display screen display means a software circuit which is a base of said control program and a hardware circuit connected to said software circuit, said software and hardware circuits being plotted on software and hardware regions of said segmented display means, respectively;
   (b) plot information storage means for storing said plot information plotted by said circuit producing means; and
   (c) means for extracting plot information of said software circuit from said plot information storage means and for translating said plot information of said software circuit into said control program.

6. A maintenance apparatus according to claim 5, further comprising document preparing means for obtaining the content of said plot information storage means to prepare various kinds of documents relating to said software circuit and/or said hardware circuit.

7. A maintenance apparatus according to claim 5, further comprising means for collecting operation data of said plant from said controller executing the control program and for displaying said operation data at corresponding portions of said software and hardware circuits being displayed on said display screen.

* * * * *